(12) United States Patent
Chowenhill et al.

(10) Patent No.: US 11,667,311 B2
(45) Date of Patent: Jun. 6, 2023

(54) SUPERCAPACITOR POWER SUPPLY FOR A GATE CROSSING MECHANISM

(71) Applicant: Siemens Mobility, Inc., New York, NY (US)

(72) Inventors: Leah Chowenhill, Pittsburgh, PA (US); Quinton Reed, Oil City, PA (US); Daniel Spencer, Pittsburgh, PA (US)

(73) Assignee: Siemens Mobility, Inc., New York, NY (US)

( * ) Notice: Subject to any disclaimer, the term of this patent is extended or adjusted under 35 U.S.C. 154(b) by 272 days.

(21) Appl. No.: 16/898,955

(22) Filed: Jun. 11, 2020

(65) Prior Publication Data
US 2021/0387658 A1 Dec. 16, 2021

(51) Int. Cl.
*B61L 29/16* (2006.01)
*H02J 7/34* (2006.01)
*H02J 9/06* (2006.01)

(52) U.S. Cl.
CPC .............. *B61L 29/16* (2013.01); *H02J 7/345* (2013.01); *H02J 9/068* (2020.01)

(58) Field of Classification Search
CPC ......... B61L 29/02–228; H02J 7/34–345; H02J 2207/50; H02J 9/06–08; E01F 13/04–085; E06B 11/02–045
See application file for complete search history.

(56) References Cited

U.S. PATENT DOCUMENTS

| 6,179,517 B1 * | 1/2001 | Nelson | E01F 13/06 404/6 |
| 2002/0185571 A1 * | 12/2002 | Bryant | B61L 29/30 246/125 |
| 2003/0029089 A1 * | 2/2003 | Wenzl | E01F 13/06 49/49 |
| 2008/0184622 A1 * | 8/2008 | Mullet | E05F 15/603 49/26 |
| 2013/0038986 A1 * | 2/2013 | Wice | H02J 7/345 361/679.01 |
| 2018/0109134 A1 * | 4/2018 | Carpenter | G06F 1/263 |
| 2018/0337550 A1 * | 11/2018 | Agrelo | H01G 11/22 |
| 2019/0131818 A1 * | 5/2019 | Bryla | G01R 19/16528 |
| 2020/0287395 A1 * | 9/2020 | Harden | H01G 11/04 |

FOREIGN PATENT DOCUMENTS

| DE | 102013108526 A1 * | 2/2015 | H02J 9/06 |
| EP | 2052942 A1 * | 4/2009 | B61L 29/08 |
| EP | 3226380 A1 * | 10/2017 | G06F 1/30 |
| KR | 20080010912 A * | 1/2008 | B61L 29/04 |

OTHER PUBLICATIONS

English machine translation of EP2052942A1 published Apr. 29, 2009 (Year: 2009).*

* cited by examiner

Primary Examiner — Rexford N Barnie
Assistant Examiner — David A Shiao

(57) ABSTRACT

Examples described herein provide a computer-implemented method that includes detecting a loss of power to a motor of the gate crossing mechanism. The motor is operably coupled to a gate of the gate crossing mechanism. The method further includes, responsive to detecting the loss of the power, providing, by at least one supercapacitor, power to the motor to initiate the gate moving from an open position to a closed position.

14 Claims, 7 Drawing Sheets

400

```
┌─────────────────────────────────────────────────────────────┐
│ Detect Loss Of Power To A Motor Of A Gate Crossing         │
│ Mechanism, The Motor Being Operably Coupled To An Arm      │
│ Of The Gate Crossing Mechanism                              │
│                                                        402  │
└─────────────────────────────────────────────────────────────┘
                              │
                              ▼
┌─────────────────────────────────────────────────────────────┐
│ Responsive To Detecting The Loss Of Power, Providing, By   │
│ At Least One Supercapacitor, Power To The Motor To Initiate│
│ The Arm Moving From An Open Position To A Closed           │
│ Position                                                    │
│                                                        404  │
└─────────────────────────────────────────────────────────────┘
```

*FIG. 4*

SUPERCAPACITOR POWER SUPPLY FOR A GATE CROSSING MECHANISM

BACKGROUND

The present invention generally relates to a gate crossing mechanism, and more specifically, to techniques for a supercapacitor power supply for a gate crossing mechanism.

An intersection where a railway line crosses a road or path is referred to as a level crossing. Level crossings utilize gate crossing mechanisms to control traffic on the road or path when a train or other vehicle is passing through the level crossing. The gate crossing mechanisms prevent vehicles, pedestrians, etc., from crossing the railway line while the gate crossing mechanism is engaged.

SUMMARY

Embodiments of the present invention are directed to direction control for a motor of a gate crossing mechanism.

A non-limiting example method for controlling a gate crossing mechanism includes detecting a loss of power to a motor of the gate crossing mechanism, the motor being operably coupled to a gate of the gate crossing mechanism. The method further includes, responsive to detecting the loss of the power, providing, by at least one supercapacitor, power to the motor to initiate the gate moving from an open position to a closed position.

A non-limiting example gate crossing mechanism includes a gate, a motor operably coupled to the gate, a supercapacitor, and a controller for performing a method. The method includes detecting a loss of power to the motor. The method further includes, responsive to detecting the loss of the power, providing, by the supercapacitor, power to the motor to initiate the gate moving from an open position to a closed position.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a flow diagram of a method for controlling a gate crossing mechanism using a supercapacitor according to one or more embodiments described herein.

Figure 1:
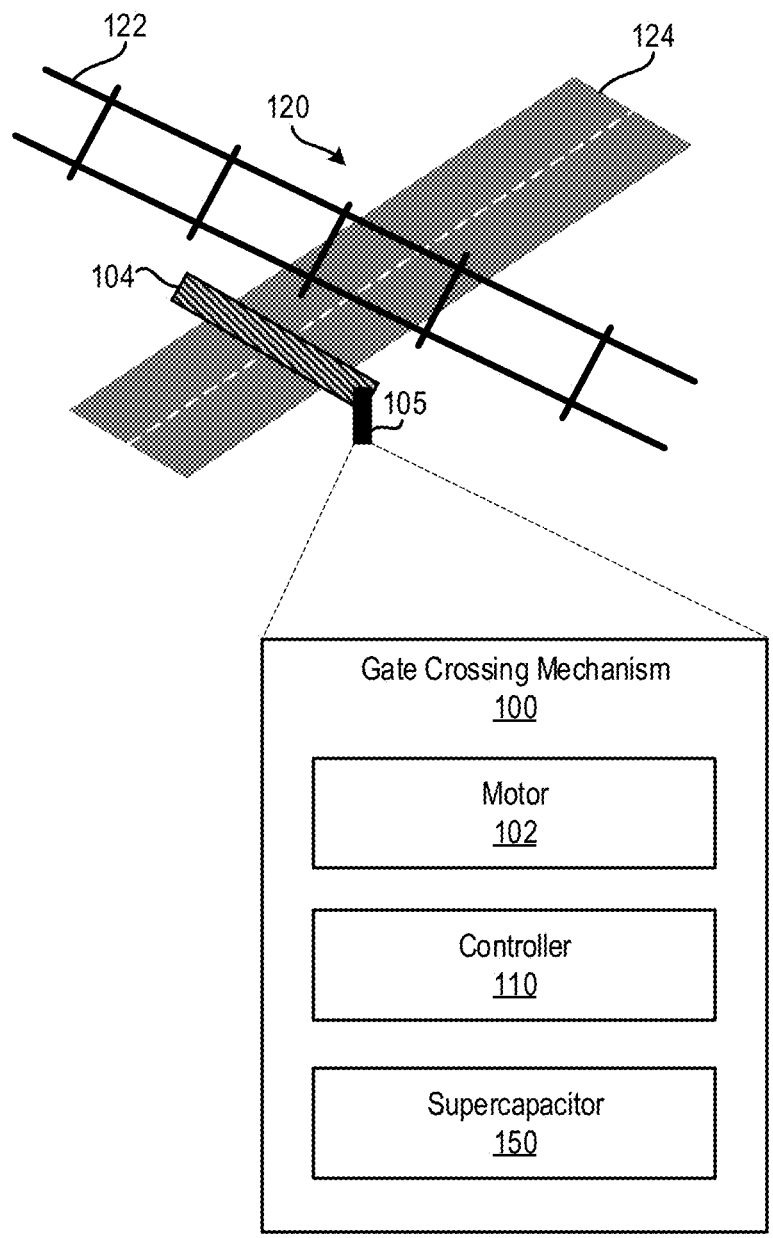
FIG. 1 depicts a block diagram of a gate crossing mechanism according to one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for a gate crossing mechanism, including techniques for controlling a gate crossing motor and/or detecting and/or preventing faults of the gate crossing motor. A gate crossing mechanism protects motorists, pedestrians, and the like from oncoming trains by blocking level crossings or points at which public or private roads cross railway lines at the same level.

As one example, a gate crossing mechanism can include an arm or "gate" that, using a motor, selectively lowers/raises depending upon whether a train or other vehicle is passing through the level crossing. For example, if a train is approaching a level crossing, a gate can be lowered to prevent traffic on the road or path from crossing the railway line. A level crossing can be equipped with multiple gate crossing mechanisms. For example, each side of the railway line can include a gate crossing mechanism. In larger intersections, each side of the railway line can include two (or more) gate crossing mechanisms. Gate crossing mechanisms can further include lights, sirens, bells, or other similar devices that can provide visual and/or aural warnings.

Conventional gate crossing mechanisms can be susceptible to failures, malfunctions, etc., which can reduce their ability to control a level crossing safely. It is, therefore, desirable to improve efficiency, reliability, and functionality of conventional gate crossing mechanisms.

The above-described aspects of the invention address the shortcomings of the prior art by providing techniques for improving the efficiency, reliability, and functionality of gate crossing mechanisms. Such aspects can include fault detection of a gate crossing motor, overspeed protection of a gate crossing motor, direction control of a gate crossing motor, thermal lockout of a gate crossing motor, and controlling a gate crossing mechanism using a supercapacitor power supply (referred to herein as a "supercapacitor").

Gate crossing mechanisms having the features and functionality described herein provide improve efficiency and address problems associated with conventional gate crossing mechanisms. For example, a gate crossing mechanism can include a brushless motor and digital control logic rather than a conventional brushed motor and mechanical cams. Motor brushes can experience uneven wear patterns, after which they must be replaced. This is both costly and time consuming for railways or those responsible for maintaining gate crossing mechanisms featuring brushed motors.

Additionally, the brushless motors of the gate crossing mechanisms described herein provide for controlling a gate crossing mechanism during a power failure using a supercapacitor. Convention gate crossing mechanisms use counterweights on the gate to enable the gate to lower from an open (i.e., substantially vertical) position to a closed (i.e., substantially horizontal) position. In some cases, the gate of a gate crossing mechanism can get stuck in the open position due to environmental factors, such as high winds, ice build-up, fallen branch or other plant material, etc. This could prevent the gate crossing mechanism from reaching a safe state (i.e., gate lowered to the closed position to prevent traffic from entering the intersection). Further, a motor of the gate crossing mechanism may provide mechanical assistance to the gate to cause it to initiate a downward movement. For example, a motor can apply an assistive force (i.e., torque) to the gate to cause the gate to begin moving from the open position to the closed position. However, during a power failure, the motor is unable to provide this assistive force, which can result in the gate being stuck in the open position and unable to lower in some cases. This results in an unsafe condition because the level crossing cannot be closed to road traffic. The present techniques address these and other shortcomings of the prior art by using a supercapacitor to provide power to the motor of the gate crossing mechanism to provide an assistive force to aid in lowering the gate, thereby preventing the stuck condition associated with conventional gate crossing mechanisms.

Turning now to FIG. 1, a block diagram of a controller 110 for a motor 102 of a gate crossing mechanism 100 is depicted according to one or more embodiments described herein. In this example, the gate crossing mechanism 100 includes the motor 102, the controller 110, a supercapacitor 150, and a gate 104. The gate 104 can be supported by any suitable structure, such as a gate support 105. The controller 110 and/or the motor 102 can be coupled to, incorporated in, or otherwise associated with the gate 104 and/or the gate support 105. The gate crossing mechanism 100 controls the gate 104 at an intersection (i.e., crossing) 120 of a railway 122 and a road 124. The gate 104, when in a "down" or "closed" position, prevents traffic traveling along the road 124 from crossing the intersection 120. When in an "up" or "open" position, the gate 104 allows traffic traveling along the road 124 to cross the intersection 120. In examples, the intersection can be controlled by additional gate crossing mechanisms (not shown). The supercapacitor 150 provides power to the motor 102 and/or the controller 110 to enable an assistive force to be applied to the gate 104 to cause the gate 104 to lower from the opened position to the closed position in the case of a power failure.

Figure 2:
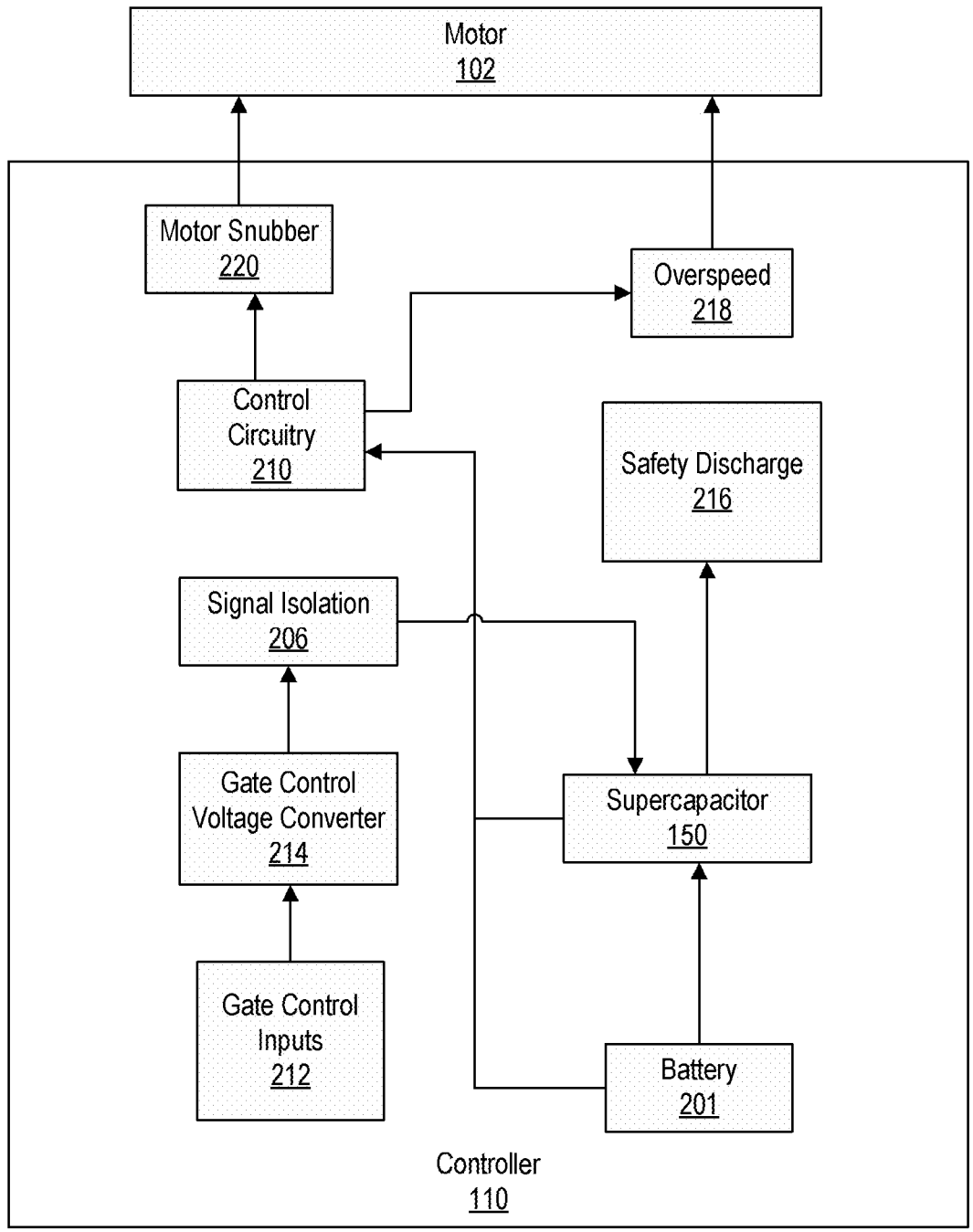
FIG. 2 depicts a block diagram of the controller of FIG. 1 being configured for controlling a gate crossing mechanism using a supercapacitor according to one or more embodiments described herein.

FIG. 2 depicts a block diagram of the controller 110 of FIG. 1 being configured for controlling a gate crossing mechanism 100 using a supercapacitor 150 according to one or more embodiments described herein. According to one or more embodiments described herein, the controller 110 can include various components configured and arranged as shown.

As one example, the controller 110 includes a battery 201, the supercapacitor 150, a safety discharge 216, gate control inputs 212, a gate control voltage converter 214, a signal isolation block 206, control circuitry 210, an overspeed block 218, and a motor snubber 220. As shown in FIG. 2, one or more of the supercapacitor 150 and the control circuitry 210 can be powered by the battery 201, although any suitable power source can be used.

As described herein, during a power failure, the motor 102 is unable to provide an assistive force to the gate 104, which can result in the gate 104 being stuck in the open position and unable to lower. The controller 110 of FIG. 2 utilizes the supercapacitor 150 to provide power to the motor 102 to enable the motor 102 to provide the assistive force to the gate 104 to enable the gate 104 to overcome a stuck condition and lower from the open position the closed position.

Power is provided to the controller 110 via the battery 201 and the gate control inputs 212. As shown, the supercapacitor 150 is charged by the battery 201 (or another power source such as the gate control inputs 212). If the battery 201 and/or the gate control inputs 212 (or another power source) become discharged or are unable to provide power (i.e., a loss of power occurs), the supercapacitor 150 can provide power to the control circuitry 210, which causes the motor snubber 210 and/or the overspeed block 218 to control the motor 102 to enable the motor 102 to provide the assistive force to the gate 104. The assistive force provided by the motor 102 causes the gate 104 to lower to the closed position from the open position. That is, the motor 102 can apply an assistive force, using power from the supercapacitor 150, to the gate 104 when the controller 110 loses power.

According to one or more embodiments described herein, the battery 201 acts as a trickle charger to keep the supercapacitor 150 charged to a high charge threshold (e.g., 12 volts). If the charge level of the supercapacitor 150 falls below a low charge threshold, the battery 201 can provide power to the supercapacitor 150 to charge the supercapacitor 150 until it is charged to the high charge threshold.

The safety discharge 216 utilizes a discharge circuit (e.g., discharge circuit 370 of FIG. 3) to enable manually discharging the supercapacitor 150, such as to enable maintenance to be safely performed.

Figure 3:
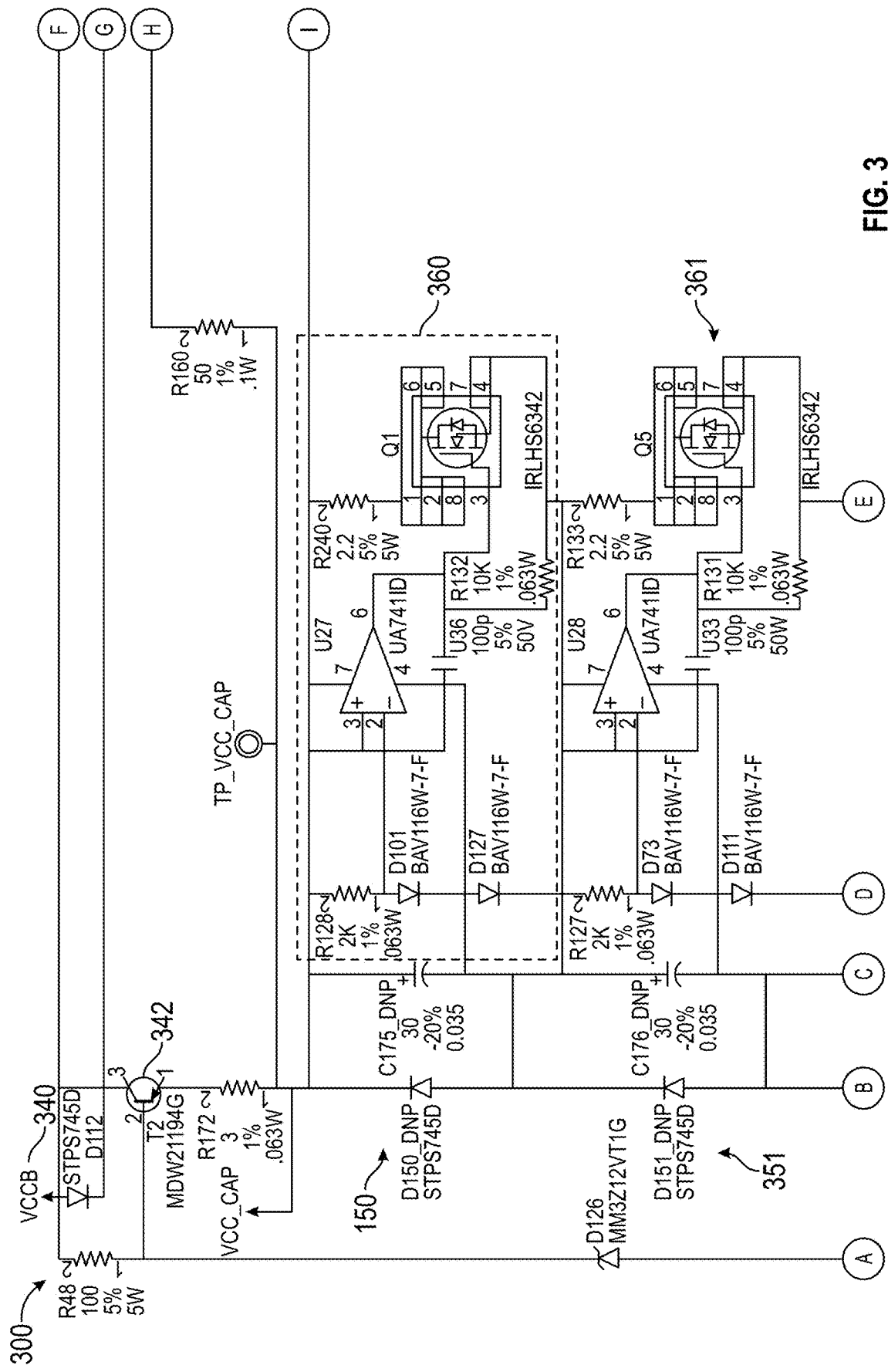
FIG. 3 depicts a circuit for having a plurality of supercapacitors for powering a gate crossing mechanism according to one or more embodiments described herein.
Figure 3:
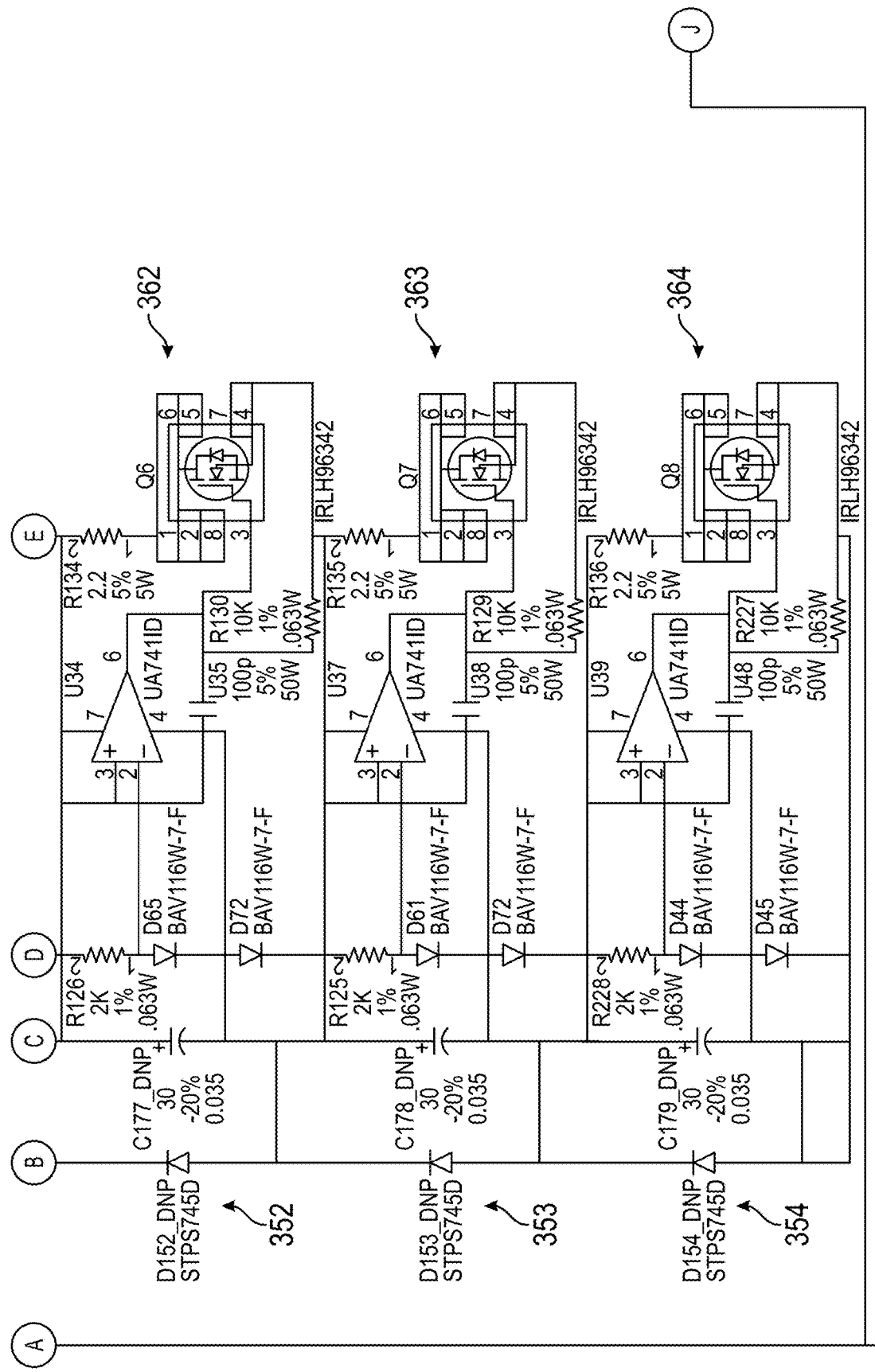
Figure 3:
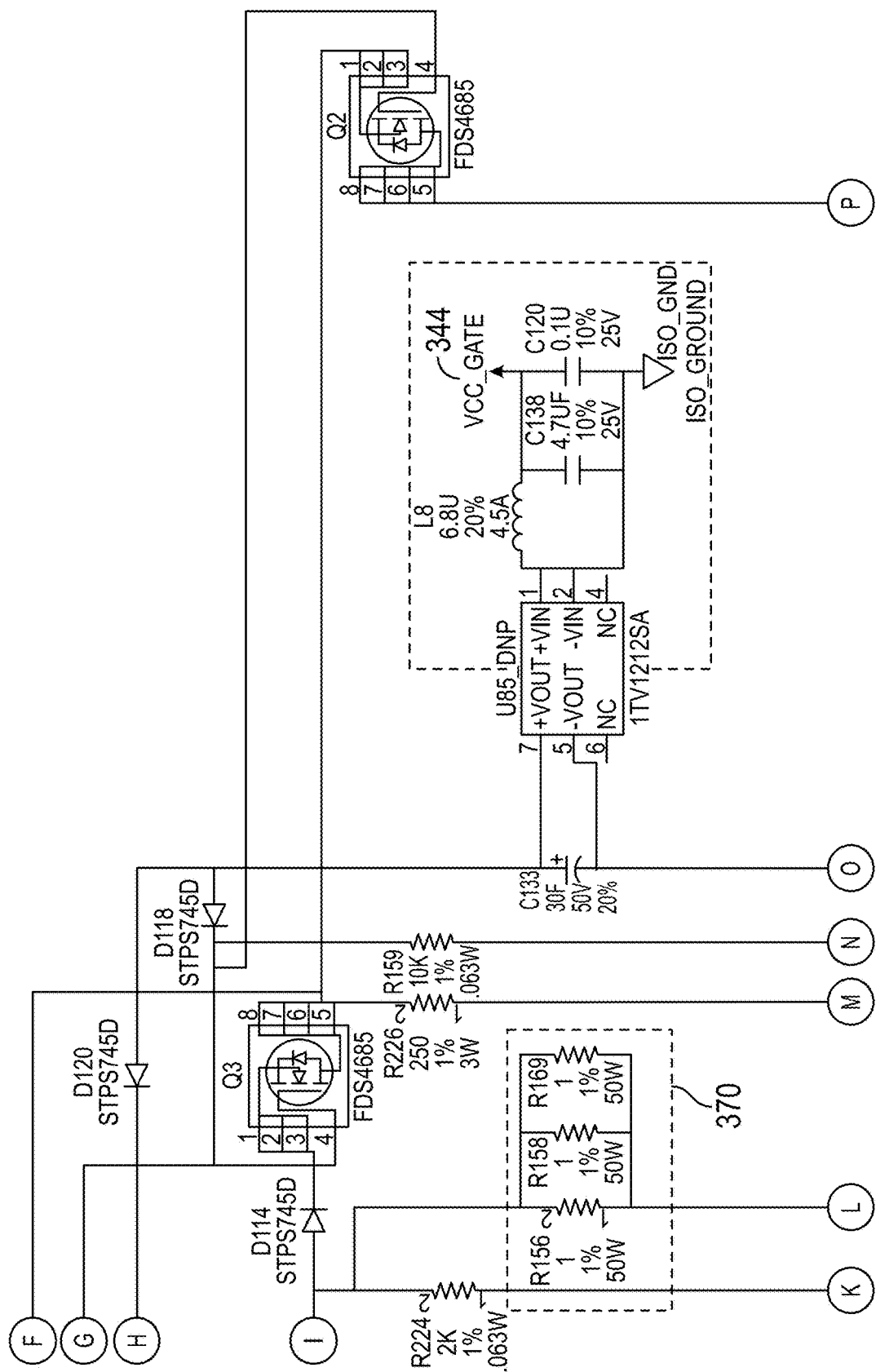
Figure 3:
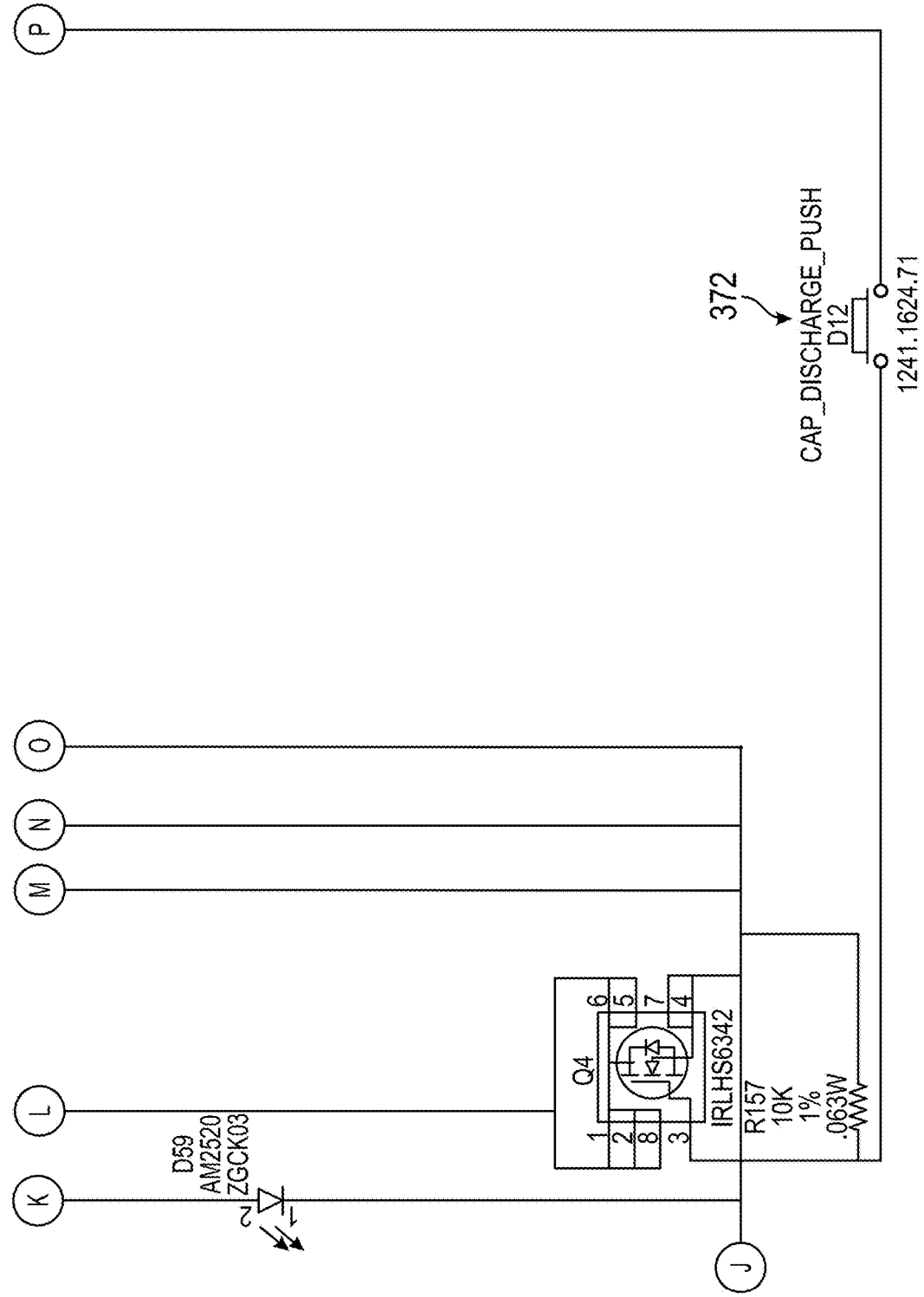

FIG. 3 depicts a circuit 300 for having a plurality of supercapacitors 150, 351, 352, 353, 354 for powering the gate crossing mechanism 100 according to one or more embodiments described herein. The circuit 300 can be implemented in or by the controller 110 for example. The supercapacitors 150, 351-354 are arranged in series, as shown, to provide a desired voltage. In the example of FIG. 3, the circuit 300 five supercapacitors 150, 351-354; however, it should be appreciated that other numbers of supercapacitors can be implemented to provide a desired voltage.

The supercapacitors 150, 351-354 receive power from the battery 201 (or another suitable power source) via VCCB 340. Once the voltage of the supercapacitors 150, 351-354 reaches a desired charge (i.e., the high charge threshold), the battery 201 (VCCB 340) is disconnected by turning off BJT 342 pin T2. In some examples, the high charge threshold is about 12 volts, although other voltages can be used. After the supercapacitors 150, 351-354 achieve their desired charge, to maintain this charge, the supercapacitors 150, 351-354 receive a trickle charge from a voltage supply derived from the gate control signals (VCC_GATE 344). Each supercapacitor 150, 351-354 is balanced to ensure that each is charging at the same rate and to the same voltage level. This balancing of the supercapacitors 150, 351-354 is managed by balancing circuits 360, 361, 362, 362, 364 respectively, which are configured and arranged as shown in FIG. 3 for example. In particular, the balancing circuits 360-364 can be active balancing circuits (as shown in FIG. 3) or passive balancing circuits (not shown). It should be appreciated that, in some implementations such as where only one supercapacitor is used, the balancing circuits 360-364 may be omitted.

Once both battery power (VCCB 340) and the gate control signal (VCC_GATE 344) are removed/disconnected from the controller 110, the gate crossing mechanism 100 is in a state of power loss (a fault state). At this point, the supercapacitors 150, 351-354 discharge and supply power to apply the assistive force to the gate 104 to enable the gate 104 to be pushed from the open position. In some examples, the assistive force lasts a predetermined period of time, such as about 3 seconds. After this period of time, the assistive force stops, and the gate 104 continues to lower to the closed position due to gravity. The period of time can be set using the low charge threshold for example. That is, the low charge threshold can be set such that it will take the desired period of time for the supercapacitors 150, 351-354 to discharge from the high charge threshold to the low charge threshold.

According to one or more embodiments described herein, a discharge circuit 370 is provided to enable manually discharging the supercapacitors 150, 351-354. This enables maintainers that are coming to perform work on the gate crossing mechanism 100 to safely discharge the supercapacitors 150, 351-354 by pressing a discharge button 372. In such cases, the discharge circuit 370 discharges the supercapacitors 150, 351-354 using one or more resistors (e.g., R156, R158, R169). A light-emitting diode (LED) can remain illuminated throughout the discharging according to one or more embodiments described herein.

FIG. 4 depicts a flow diagram of a method 400 for controlling the gate crossing mechanism 100 using a supercapacitor (e.g., one or more of the supercapacitors 150, 351-354) according to one or more embodiments described herein. The method 400 can be implemented by any suitable processing system or device, such as the controller 110. The method 400 is now described with reference to FIGS. 1-3.

At block 402, the controller 110 (or any other suitable processing system and/or processing device) detects a loss of power to the motor 102 of the gate crossing mechanism 100. The motor 102 is operably coupled to the gate 104 of the gate crossing mechanism 100.

At block 404, responsive to detecting the loss of power at block 402, the supercapacitor 150 provides power to the motor 102 to initiate the gate 104 moving from an open position to a closed position. In some examples, such as shown in FIG. 3, multiple supercapacitors (e.g., the supercapacitors 150 and 351-354) are used and arranged in series. In the case of multiple supercapacitors, each supercapacitor can be electrically coupled to a balancing circuit to provide balanced charging to each of the supercapacitors. The balancing circuit can be an active balancing circuit (as shown in FIG. 3) or a passive balancing circuit (not shown).

Additional processes also may be included. For example, the method 400 can include, subsequent to restoration of the power, recharging the supercapacitor 150 using a battery 201 until the supercapacitor 150 has a charge level at least equal to a high charge threshold. As an example, the high charge threshold can be a voltage threshold, such as 12 volts, or another suitable voltage that enables the supercapacitor 150 to operate the gate 104.

In another example, the method 400 can include, responsive the charge level of the supercapacitor 150 dropping below a low charge threshold, recharging the at least one supercapacitor using a voltage supply derived from a gate controller (e.g., the battery 201) until the supercapacitor 150 has a charge level at least equal to the high charge threshold. As an example, the low charge threshold can be a voltage threshold, such as 9 volts, or another suitable voltage that, when reached, causes the supercapacitor to stop sending power to the motor 102. In some examples, the supercapacitor sends power to the motor 102 responsive to detection of a power loss until the supercapacitor is fully discharged of power.

In another example, the controller 110 can include a discharge circuit 370. The discharge circuit 370 causes the supercapacitor 150 (and any additional supercapacitors, including supercapacitors 351-354) to discharge responsive to a discharge button 372 being engaged. This enables, for example, maintenance to be performed without risking electrocution by the supercapacitor. The discharge circuit 370 can include one or more resistors (e.g., R156, R158, R169) and/or one or more LED (e.g., D59). For example, an LED can remain illuminated during the discharging, and the LED stops illuminating once the discharge is complete (i.e., once the supercapacitor has been fully discharged) to indicate that the supercapacitor has been fully discharged.

It should be understood that the process depicted in FIG. 4 represents an illustration, and that other processes may be added or existing processes may be removed, modified, or rearranged without departing from the scope of the present disclosure.

The embodiments described herein may be implemented as one or more systems, methods, and/or computer program products at any possible technical detail level of integration. The computer program product may include a computer readable storage medium (or media) having computer readable program instructions thereon for causing a processor to carry out aspects of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for controlling a gate crossing mechanism, the method comprising:
    powering a motor of the gate crossing mechanism, the motor being operably coupled to a gate of the gate crossing mechanism, and the motor being powered by a battery and gate control signals received by a controller, the controller controlling operation of the motor,
    detecting a loss of power to the motor of the gate crossing mechanism, the loss of power including a loss of battery power and loss of the gate control signals;
    responsive to detecting the loss of the power, providing, by at least one supercapacitor, power to the motor to initiate the gate moving from an open position to a closed position; and
    subsequent to restoration of the power, recharging the at least one supercapacitor using the battery until the at least one supercapacitor has a charge level at least equal to a high charge threshold; and
    maintaining the charge level equal to the high charge threshold via a trickle charge from a voltage supply derived from the gate control signals.

2. The method of claim 1, further comprising:
    responsive to the charge level of the at least one supercapacitor dropping below a low charge threshold, recharging the at least one supercapacitor using a voltage supply derived from a gate controller until the at least one supercapacitor has the charge level at least equal to the high charge threshold.

3. The method of claim 1, further comprising:
    responsive to a discharge button being engaged, discharging the at least one supercapacitor using a discharge circuit.

4. The method of claim 3, wherein the discharge circuit comprises at least one resistor.

5. The method of claim 3, wherein the discharge circuit comprises at least one resistor and at least one light-emitting diode that remains illuminated during the discharging.

6. The method of claim 1, wherein the at least one supercapacitor comprises a plurality of supercapacitors, wherein the plurality of supercapacitors are arranged in series.

7. The method of claim 6, wherein each of the plurality of supercapacitors is electrically coupled to a balancing circuit.

8. The method of claim 7, wherein the balancing circuit is an active balancing circuit.

9. The method of claim 7, wherein the balancing circuit is a passive balancing circuit.

10. A gate crossing mechanism comprising:
    a gate;
    a motor operably coupled to the gate;
    a controller including a battery and gate control circuitry configured to provide power to the motor, the controller being configured to control operation of the motor and receive gate control signals providing power;
    a supercapacitor coupled to the battery, the supercapacitor being charged by the battery;
    wherein the controller is configured to perform a method, the method comprising:
        detecting a loss of power to the motor based on a loss of battery power and loss of the gate control signals; and
        responsive to detecting the loss of the power, providing, by the supercapacitor, power to the motor to initiate the gate moving from an open position to a closed position; and
        recharging the supercapacitor using the battery until the supercapacitor has a charge level at least equal to a high charge threshold, and
        maintaining the charge level equal to the high charge threshold by providing a trickle charge from a voltage supply derived from the gate control signals.

11. The gate crossing mechanism of claim 10, wherein the supercapacitor is a first supercapacitor, the gate crossing mechanism further comprising a second super capacitor arranged in series with the first supercapacitor.

12. The gate crossing mechanism of claim 11, wherein the first supercapacitor is electrically coupled to a first balancing circuit and wherein the second supercapacitor is electrically coupled to a second balancing circuit.

13. The gate crossing mechanism of claim 10 further comprising:
    a discharge button electrically coupled to a discharge circuit, the discharge circuit comprising at least one resistor and at least one light-emitting diode (LED).

14. The gate crossing mechanism of claim 13, wherein the method further comprises:

responsive to the discharge button being engaged, discharging the supercapacitor using the discharge circuit, wherein the at least one LED remains illuminated during the discharging.

\* \* \* \* \*